G. W. Sanderson,
Stable Hook.
No. 96,840.    Patented Nov. 16. 1869.
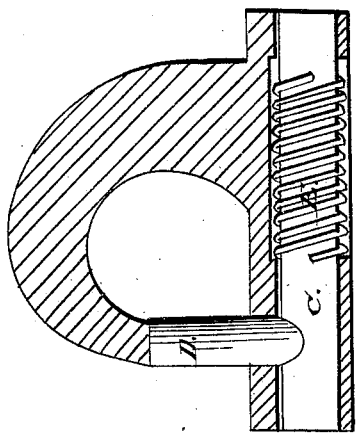
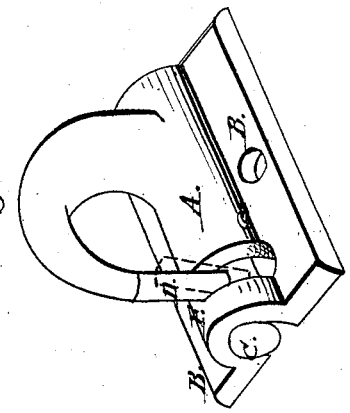
WITNESSES:
Henry T. French.
A. Edgarton
INVENTOR:
G. W. Sanderson

United States Patent Office.

GEORGE W. SANDERSON, OF SHIRLEY, MASSACHUSETTS.

Letters Patent No. 96,840, dated November 16, 1869.

IMPROVED STABLE-HOOK.

The Schedule referred to in these Letters Patent and making part of the same.

Be it known that I, GEORGE W. SANDERSON, of Shirley, in the Commonwealth of Massachusetts, have invented a new and useful Improvement in Stable-Hooks; and I do hereby declare that the following is a full, clear, and exact description of the construction and operation of the same, reference being had to the annexed drawings, making a part of this specification, in which—

Figure 1 is a perspective view.

Figure 2 is a section.

The nature of my invention consists in so arranging a hook in a stable, or elsewhere, that a horse or other animal may be readily fastened or loosed without tying or untying a knot or using a buckle.

The most important feature of my invention is found in having the latch or snap open outwardly, so that the rope or halter may be readily released by a pull upon it with one hand, without using the other hand to move the latch.

It will be especially useful attached to a manger where a halter-weight is used.

Again, where a rope is used, a permanent loop or knot may be made at the end, and the rope may be readily slipped into the hook by moving the latch, and thus tie the animal easily and securely, and allow him to be instantly loosed on ordinary occasions, or in case of accident.

In the drawings, which are of full size—

A represents the main body of the hook, of cast or wrought metal, made solid with the flanges B, through which are holes for screws or bolts, to attach it to the manger or post.

C represents a latch, of which the projection D passes through the slot in the body of the hook, and is held in place by the spiral spring E, around the rolling part of the latch C, and is stopped by the shoulder at F.

Other forms of springs may be used to close the opening in the hook.

What I claim as my invention, and desire to secure by Letters Patent, is as follows:

I claim the stable-hook, composed of the hook A and spring-latch D, constructed and operating so that said latch opens outwardly, substantially as described.

G. W. SANDERSON.

Witnesses:
H. F. FRENCH,
H. EDGARTON.